UNITED STATES PATENT OFFICE.

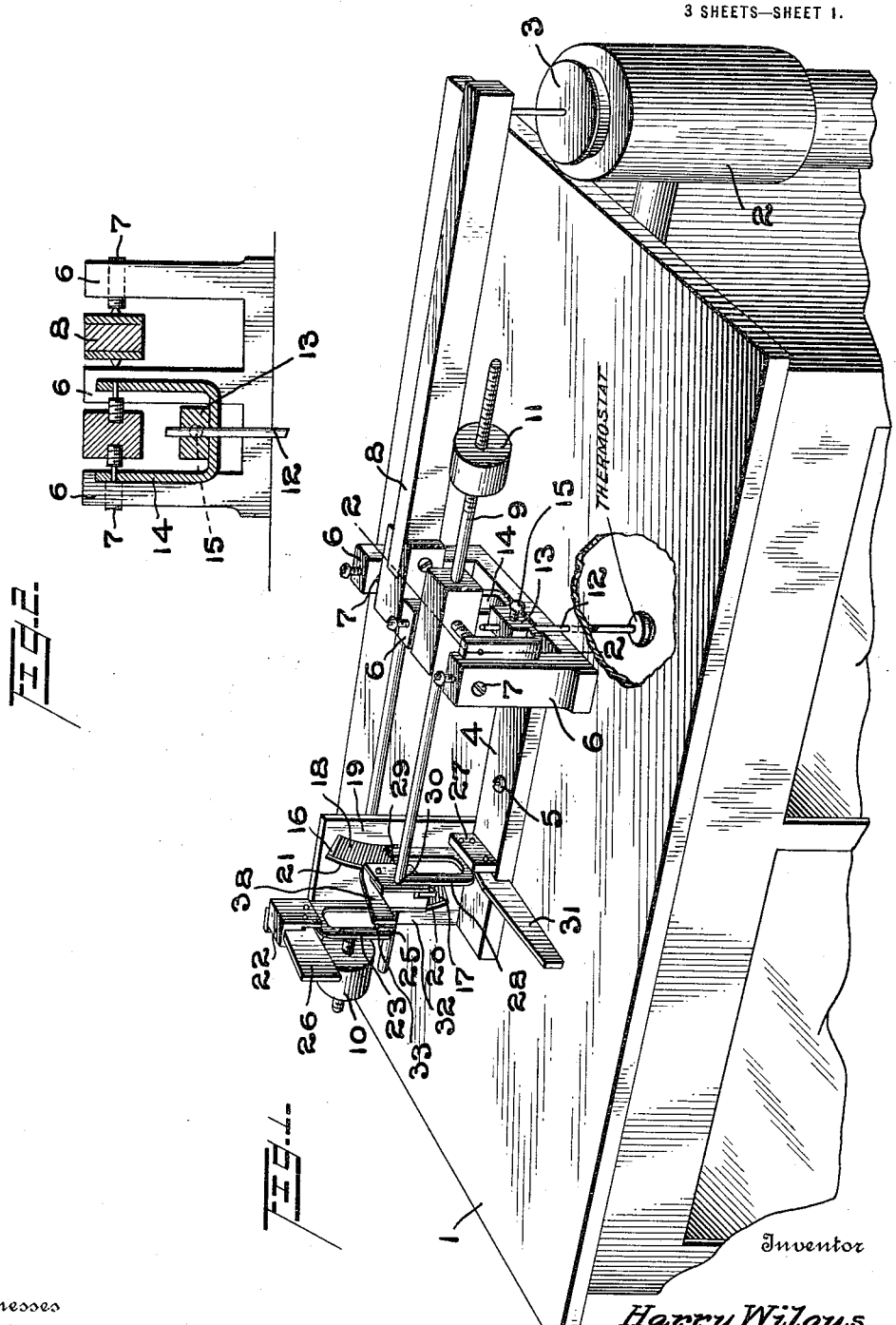

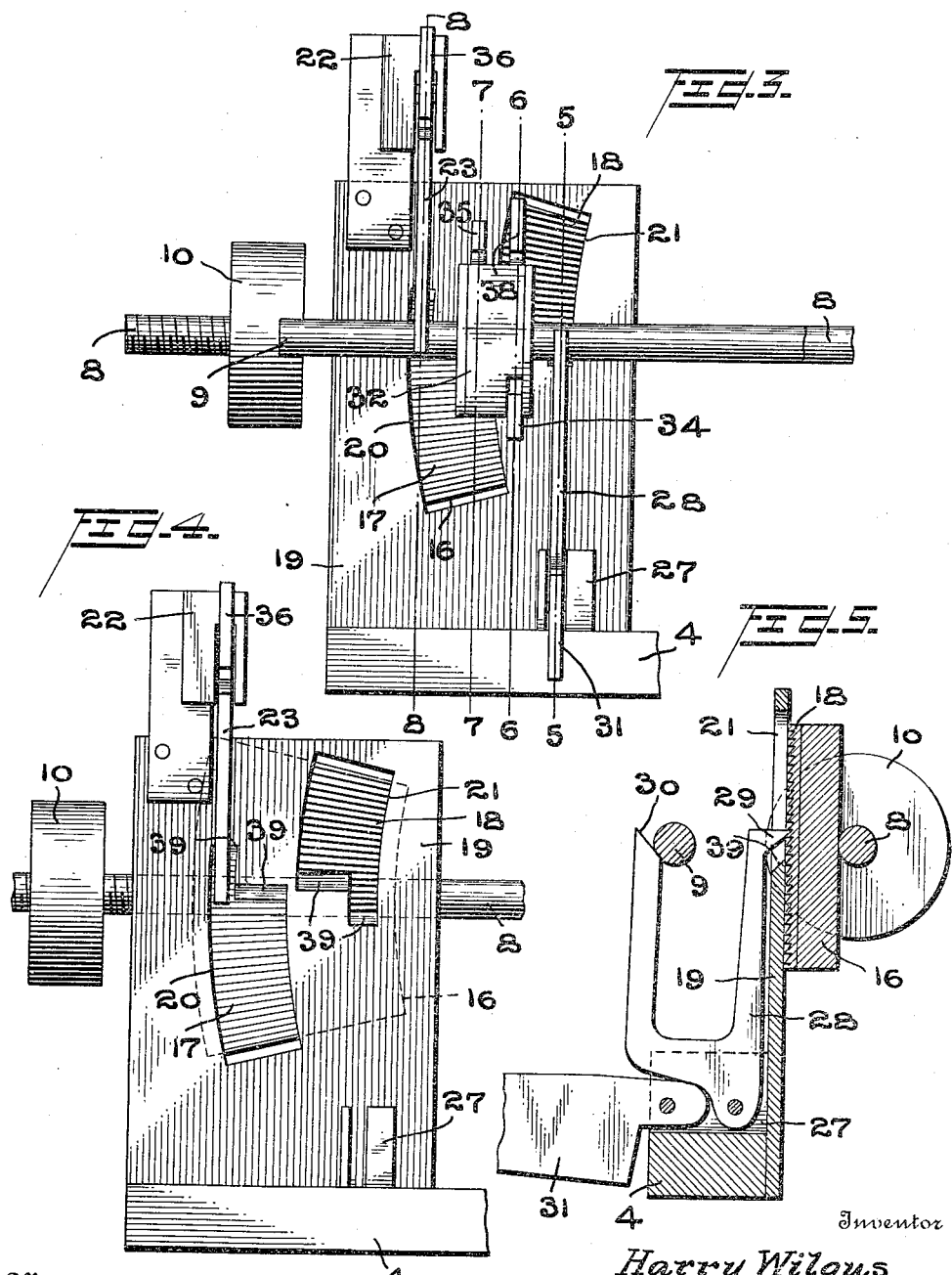

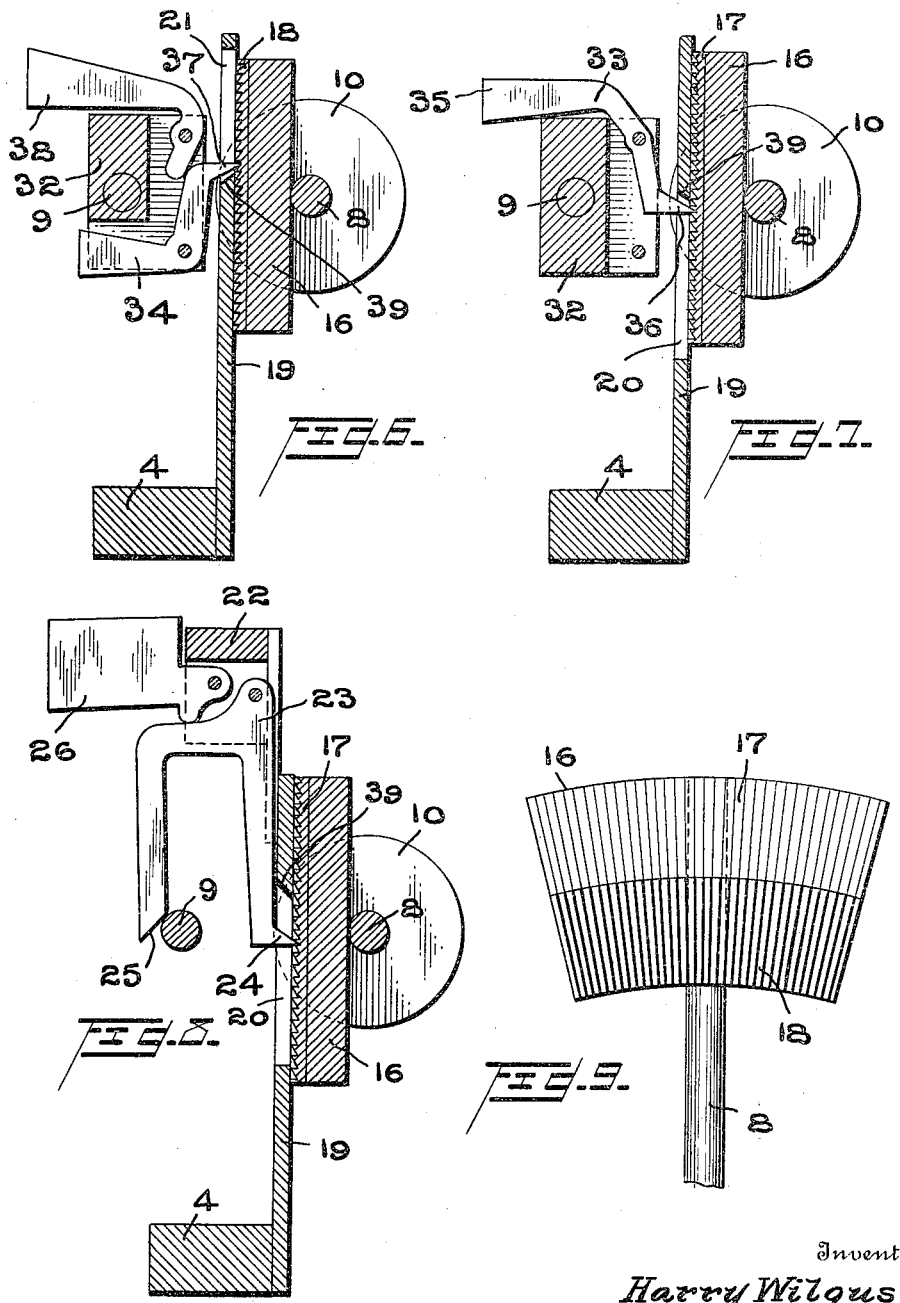

HARRY WILGUS, OF PHILADELPHIA, PENNSYLVANIA.

DAMPER-CONTROLLING MECHANISM.

1,137,369.  Specification of Letters Patent.  Patented Apr. 27, 1915.

Application filed June 10, 1914. Serial No. 844,134.

*To all whom it may concern:*

Be it known that I, HARRY WILGUS, a citizen of the United States, residing at Philadelphia, in the county of Philadelphia and State of Pennsylvania, have invented certain new and useful Improvements in Damper - Controlling Mechanism, of which the following is a specification.

My invention relates to improvements in damper controlling mechanism, the object of the invention being to provide an improved damper control operated by a thermostat to move the damper and permit the damper to remain in the position to which it is moved until the temperature varies within certain limits.

Heretofore dampers have been operated by thermostats and have been movable with the thermostat so that the parts are to all intents and purposes constantly moving. In other words, a slight variation in temperature causes the damper to immediately move, and hence there is no uniformity of temperature because of this fact. With my improvements, the movement of the thermostat will cause the damper to move but the damper will remain in the position to which it is moved until the thermostat operates within a pre-determined degree. A further object is to provide improvements of the character stated which permit the parts to be adjusted to control the temperature within any desired limits, and which prevent sudden changes of temperature but insure a uniformity of temperature within the prescribed elements.

With these and other objects in view, the invention consists in certain novel features of construction and combinations and arrangements of parts as will be more fully hereinafter described and pointed out in the claims.

In the accompanying drawings: Figure 1 is a perspective view illustrating my improvements in connection with an incubator. Fig. 2 is a view in cross section on the line 2—2 of Fig. 1. Fig. 3 is a view in elevation on an enlarged scale illustrating my improved arrangement of pawls and racks with which they engage. Fig. 4 is a view similar to Fig. 3 with parts removed to illustrate details back of the same. Fig. 5 is a view in section on the line 5—5 of Fig. 3. Fig. 6 is a view in section on the line 6—6 of Fig. 3. Fig. 7 is a view in section on the line 7—7 of Fig. 3. Fig. 8 is a view in section on the line 8—8 of Fig. 3, and Fig. 9 is a face view of the concentric racks.

1 represents an incubator, and 2 a heater of any approved construction having a damper 3 to control the temperature within the incubator 1.

My improved damper controlling mechanism is located on top of the incubator, and the several parts thereof are supported by a frame 4 which is secured by screws 5 to the top of the incubator. This frame 4, at one end, is provided with three uprights 6, in which screw bearings 7 are located for pivotally supporting two levers 8 and 9. The particular manner of supporting these levers may, of course, be varied, but I preferably employ screw bearings to allow them to be adjusted to properly position them relative to the coöperating features of the mechanism.

To one end of the lever 8, which I shall hereinafter refer to as the "damper lever," the damper 3 is connected, and on the other end of the said lever 8, a weight 10 is supported, and is rendered adjustable by reason of the fact that it is provided with a screw-threaded opening engaging a screw-threaded end of the lever. A similar weight 11 is adjustable on one end of lever 9, so that by means of these weights 10 and 11, the two levers may be nicely balanced and permit the parts to be easily moved.

12 represents a rod which extends through the top of the incubator, and is to be connected to any ordinary thermostat. This rod projects through a block 13 in a yoke 14, said yoke being pivotally connected at its upper end to the lever 9.

A set screw 15 is provided in the block 13, and is adapted to lock the rod 12 to the yoke. On the damper lever 8, I secure a block 16 having on one face two ratchet racks 17 and 18 respectively. The teeth of these racks are oppositely beveled, and said racks are curved slightly and are concentric with the pivot or fulcrum of the lever.

The block 16 lies back of an upright plate 19 fixed to frame 4, and this plate 19 has curved openings 20 and 21 therein behind which the racks 17 and 18 respectively are located. On the upper end of the plate 19, a bracket 22 is fixed, and pivotally supports a locking pawl 23. This pawl 23 is of inverted U-shape, and is provided on one of its legs with a beveled lug 24 which engages rack 17, serving to lock the said rack against upward movement. The other leg of the pawl 23, has a beveled end 25 to be engaged by the lever 9 when the latter moves upwardly to draw the pawl 23 out of locked engagement with rack 17.

A pivoted weight 26, supported on bracket 22, normally holds the pawl 23 in its operative position. On frame 4, a bracket 27 is located and pivotally supports a U-shaped locking pawl 28. This pawl 28 corresponds in shape to the pawl 22, except that its position is reversed and its beveled lug 29 engages the rack 18 and normally holds the rack against downward movement.

The beveled end 30 of the pawl 28 is engaged by the lever 9 on the downward movement of the latter to force the pawl out of locked engagement with the rack, and a pivoted weight 31 supported by bracket 27 normally holds the pawl in its operative position.

A block 32 is secured to lever 9, and this block 32 pivotally supports two ratchet dogs 33 and 34 respectively. The ratchet dog 33 has its beveled end 36 in engagement with rack 17, and its weighted end 35 normally holds the dog in this position. The ratchet dog 34 has its beveled end 37 in engagement with the rack 18, and a pivoted weight 38 normally holds the dog in engagement with the rack.

It will be noted that the dogs 33 and 34 are oppositely positioned, so that while one of them locks with the rack when moving upwardly, the other one will ride freely over its rack and vice versa.

The operation is as follows: The screw 15 is loosened so that the rod 12 is free to slide in the yoke. When the thermostat within the incubator assumes a position in accordance with the temperature desired, the screw 15 is tightened to clamp the rod. The parts will then be in a normal position, that is, both levers 8 and 9 will be substantially horizontal and the lever 9 will be in the position shown in the drawings. If the temperature within the incubator falls below normal, rod 12 will move downwardly. This will cause lever 9 to move, and compel the rear end of the lever to move upwardly. The lever 9 will first engage the beveled surface 25 of locking pawl 23, and swing this locking pawl out of locked position with rack 17. At the same time, the dog 34 will be in locked engagement with the rack 18 and will cause the block 16 and the rear end of lever 9 to move upwardly, thereby lowering the damper 3 and causing the temperature within the incubator to rise. When the block 16 is elevated by means of the dog 34, the locking pawl 28 will ride freely over the teeth of rack 18, and while dog 33 was in locked engagement with its rack, it will be moved out of such engagement by reason of the fact that the beveled end 36 will ride against the outer face of plate 19 and hold the dog 33 out of engagement with its rack 17 until the lever 9 is lowered to normal position. This upward movement of the block 16 ceases as soon as the thermostat ceases to contract. When the thermostat begins to expand by reason of the rise in temperature, the damper 3 does not move, but remains in its position. The expansion of the thermostat, however, causes the rear end of lever 9 to move downwardly, but any movement of lever 8 is prevented because locking pawl 28 will hold the block 16 against downward movement, and the dog 33 is held out of contact with its rack until the block 32 lowers to a position to allow the lug 36 to swing into the opening 20. After the lever 9 reaches its normal horizontal position, if the thermostat continues to expand, this rear end of the lever will continue to move downwardly and dog 33 will lock with its rack 17 while locking pawl 28 will be moved out of locking position. During this downward movement, below the normal horizontal position of the lever, the dog 34 will ride against the outer surface of plate 19, hence particular attention is called to the shapes of the combinations 20 and 21, which allow the locking pawls 23 and 28 to engage the respective racks after the dogs have been forced out of contact by reason of engagement with the outer surface of plate 19. In other words, the dog 34 is held out of operation, while the lever 9 moves from its normal horizontal position downwardly, and until it returns to such position. The dog 33 is maintained out of operation by contact with plate 19, while the lever 9 moves from its normal horizontal position upwardly and returns to horizontal position. The end walls of the openings 20 and 21 are beveled as clearly shown at 39 to cause the dogs 33 and 34 to ride readily into and out of openings 20 and 21. By reason of this arrangement of parts, the damper remains where it is placed until the parts return to normal and move past normal position. For example, if the normal temperature in the incubator is 103, and it falls to 101, the damper will be moved to a position to cause the temperature to rise and will remain in this position until after the temperature has reached 103 and begun to go higher. During the time the temperature rises from 101 to 103, the damper will be absolutely stationary. There can therefore be no quick fluctuations in temperature and after a normal temperature is secured and maintained, the parts will not easily fluctuate, and a uniform temperature may be maintained.

While I have described my improvements in connection with an incubator, it is to be understood that the same might be used with any temperature regulating means for the control of the damper or other device which regulates the raising and lowering of the temperature, and I do not limit myself to incubators, nor to any particular temperature controlling means, nor do I limit myself to the particular details of construction set forth, but consider myself at liberty to make such changes and alterations as fairly fall within the spirit and scope of the appended claims.

Having thus described my invention, what I claim as new and desire to secure by Letters Patent is:

1. A damper controlling mechanism, comprising two movable members, one member adapted to be connected to a damper, and the other member to a thermostat, and means permitting the thermostat-controlled member on its initial movement in both directions to move independently of the damper-connected member and during the remainder of its movement in both directions to move the damper-connected member therewith, substantially as described.

2. A damper controlling mechanism, comprising a damper lever, a second lever adapted to be moved by a thermostat, and ratchet means connecting the levers, said ratchet means permitting the thermostat controlled lever on its initial movement in both directions to move independently of the damper lever, and during the remainder of its movement in both directions to move the damper lever therewith, substantially as described.

3. A damper controlling mechanism, comprising a damper supporting lever, a lever adapted to be moved by a thermostat, and ratchet mechanism connecting the levers whereby a portion of the movement of the last-mentioned lever is imparted to the first-mentioned lever, substantially as described.

4. A damper controlling mechanism, comprising a damper supporting lever, a second lever adapted to be moved by a thermostat, a pair of ratchet racks supported by the first-mentioned lever, ratchet dogs carried by the last-mentioned lever and engaging the racks, locking pawls engaging the racks, said lever adapted to move the locking pawls out of engagement with the racks, and said dogs adapted to cause the movement of the racks when the last-mentioned lever is moved by the thermostat, substantially as described.

5. A damper controlling mechanism, comprising a damper supporting lever, a second lever adapted to be moved by a thermostat, a pair of ratchet racks supported by the first-mentioned lever, ratchet dogs carried by the last-mentioned lever and engaging the racks, locking pawls engaging the racks, said lever adapted to move the locking pawls out of engagement with the racks, and said dogs adapted to cause the movement of the racks when the last-mentioned lever is moved by the thermostat, and a plate adapted to hold one of the locking dogs out of engagement with its rack when the lever is moved in one direction and to hold the other dog out of engagement with its rack when the lever is moved in the opposite direction, substantially as described.

6. A damper controlling mechanism, comprising a damper supporting lever, a second lever adapted to be moved by a thermostat, a pair of ratchet racks supported by the first-mentioned lever, ratchet dogs carried by the last-mentioned lever and engaging the racks, locking pawls engaging the racks, said lever adapted to move the locking pawls out of engagement with the racks, and said dogs adapted to cause the movement of the racks when the last-mentioned lever is moved by the thermostat, and said dogs and pawls having weighted portions normally holding them in position to engage the racks, substantially as described.

7. A damper controlling mechanism, comprising a damper supporting lever, a second lever adapted to be moved by a thermostat, a pair of ratchet racks supported by the first-mentioned lever, ratchet dogs carried by the last-mentioned lever and engaging the racks, locking pawls engaging the racks, said lever adapted to move the locking pawls out of engagement with the racks, and said dogs adapted to cause the movement of the racks when the last-mentioned lever is moved by the thermostat, and a plate adapted to hold one of the locking dogs out of engagement with its rack when the lever is moved in one direction and to hold the other dog out of engagement with its rack when the lever is moved in the opposite direction, and said dogs and pawls having weighted portions normally holding them in position to engage the racks, substantially as described.

8. A damper controlling mechanism comprising a damper lever, a second lever adapted to be moved by a thermostat, means compelling the first-mentioned lever to be moved by the last-mentioned lever during a portion only of the movement of said last-mentioned lever, a yoke supported on the thermostat operated lever and having an opening therethrough, a rod projected through said opening and adapted to be connected to a thermostat, and a set screw in said yoke engaging the rod, substantially as described.

9. A damper controlling mechanism, comprising a damper supporting lever, a lever adapted to be moved by a thermostat, ratchet mechanism connecting the levers whereby a portion of the movement of the last-mentioned lever is imparted to the first-mentioned lever, a yoke supported on the thermostat operated lever and having an opening therethrough, a rod projected through said opening and adapted to be connected to a thermostat, and a set screw in said yoke engaging the rod, substantially as described.

10. A damper controlling mechanism, comprising a damper supporting lever, a second lever adapted to be moved by a thermostat, a pair of ratchet racks supported by the first-mentioned lever, ratchet dogs carried by the last-mentioned lever and engaging the racks, locking pawls engaging the racks, said lever adapted to move the locking pawls out of engagement with the racks, said dogs adapted to cause the movement of the racks when the last-mentioned lever is moved by the thermostat, a yoke supported on the thermostat operated lever and having an opening therethrough, a rod projected through said opening and adapted to be connected to a thermostat, and a set screw in said yoke engaging the rod, substantially as described.

11. A damper controlling mechanism, comprising a damper supporting lever, a second lever adapted to be moved by a thermostat, a pair of ratchet racks supported by the first-mentioned lever, ratchet dogs carried by the last-mentioned lever and engaging the racks, locking pawls engaging the racks, said lever adapted to move the locking pawls out of engagement with the racks, and said dogs adapted to cause the movement of the racks when the last-mentioned lever is moved by the thermostat, a plate adapted to hold one of the locking dogs out of engagement with its rack when the lever is moved in one direction and to hold the other dog out of engagement with its rack when the lever is moved in the opposite direction, a yoke supported on the thermostat operated lever and having an opening therethrough, a rod projected through said opening and adapted to be connected to a thermostat, and a set screw in said yoke engaging the rod, substantially as described.

12. A damper controlling mechanism, comprising a damper supporting lever, a second lever adapted to be moved by a thermostat, a pair of ratchet racks supported by the first-mentioned lever, ratchet dogs carried by the last-mentioned lever and engaging the racks, locking pawls engaging the racks, said lever adapted to move the locking pawls out of engagement with the racks, and said dogs adapted to cause the movement of the racks when the last-mentioned lever is moved by the thermostat, said dogs and pawls having weighted portions normally holding them in position to engage the racks, a yoke supported on the thermostat operated lever and having an opening therethrough, a rod projected through said opening and adapted to be connected to a thermostat, and a set screw in said yoke engaging the rod, substantially as described.

13. A damper controlling mechanism, comprising a damper supporting lever, a second lever adapted to be moved by a thermostat, a pair of ratchet racks supported by the first-mentioned lever, ratchet dogs carried by the last-mentioned lever and engaging the racks, locking pawls engaging the racks, said lever adapted to move the locking pawls out of engagement with the racks, and said dogs adapted to cause the movement of the racks when the last-mentioned lever is moved by the thermostat, a plate adapted to hold one of the locking dogs out of engagement with its rack when the lever is moved in one direction and to hold the other dog out of engagement with its rack when the lever is moved in the opposite direction, said dogs and pawls having weighted portions normally holding them in position to engage the racks, a yoke supported on the thermostat operated lever and having an opening therethrough, a rod projected through said opening and adapted to be connected to a thermostat, and a set screw in said yoke engaging the rod, substantially as described.

14. A damper controlling mechanism, comprising a frame, an upright plate on the frame having openings therein, two horizontal levers pivotally supported between their ends on the frame, one of said levers adapted to support a damper, the other of said levers adapted to be connected to a thermostat, a block on the damper supporting lever having two curved oppositely arranged ratchet racks on one face with the racks exposed through the openings in the plate, locking pawls on the plate and frame respectively engaging the racks, and pivoted dogs on the last-mentioned lever engaging the racks, said last-mentioned lever adapted to control the operation of the pawls, and said plate controlling the operation of the dogs, whereby the levers are caused to move together during a movement in one direction, and the last-mentioned lever is permitted to move independently in its return movement, substantially as described.

15. A damper controlling mechanism comprising a damper supporting lever, a second lever adapted to be moved by a thermostat, a pair of ratchet racks supported by the first-mentioned lever, ratchet dogs carried by the last-mentioned lever and engaging the racks, locking pawls engaging the racks, a plate having openings therein for the engagement of the dogs with the racks, said plate adapted to hold one of the dogs out of engagement with its rack during the movement of the lever in one direction, and the other dog out of engagement with its rack during the opposite movement of the lever, said lever adapted to move the locking pawls out of engagement with the racks, and said dogs adapted to cause the movement of the racks when the last-mentioned lever is moved by the thermostat, substantially as described.

In testimony whereof I have signed my name to this specification in the presence of two subscribing witnesses.

HARRY WILGUS.

Witnesses:
 LILLIE C. WILGUS,
 CHAS. E. POTTS.

Copies of this patent may be obtained for five cents each, by addressing the "Commissioner of Patents, Washington, D. C."